(12) United States Patent
Maya et al.

(10) Patent No.: US 7,581,778 B2
(45) Date of Patent: Sep. 1, 2009

(54) SUPPORT STRUCTURE FOR A MOTOR VEHICLE HAVING LONGITUDINAL MEMBERS AND A CROSSMEMBER

(75) Inventors: Andreas Maya, Neubulach (DE); Jan Hogenmüller, Leonberg (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/781,389

(22) Filed: Jul. 23, 2007

(65) Prior Publication Data

US 2008/0018121 A1   Jan. 24, 2008

(30) Foreign Application Priority Data

Jul. 22, 2006   (DE)   ............ 10 2006 033 990

(51) Int. Cl.
B60R 19/26 (2006.01)
(52) U.S. Cl. ......................... 296/132; 293/134
(58) Field of Classification Search ............ 296/193.09, 296/203.02, 205, 29, 187.03; 293/132, 133, 293/155
See application file for complete search history.

(56) References Cited

U.S. PATENT DOCUMENTS

| | | | |
|---|---|---|---|
| 2,144,357 A | | 1/1939 | Booharin |
| 3,700,273 A | * | 10/1972 | Jackson et al. ............... 293/134 |
| 3,820,771 A | * | 6/1974 | Kerr ............................ 293/134 |
| 4,045,009 A | * | 8/1977 | Pees ............................ 293/134 |
| 4,426,109 A | | 1/1984 | Fike, Jr. |
| 4,629,232 A | * | 12/1986 | Zimlich et al. ............... 293/135 |
| 4,915,363 A | * | 4/1990 | Prozeller et al. ......... 267/64.15 |
| 4,988,081 A | * | 1/1991 | Dohrmann ............... 267/64.15 |
| 5,393,095 A | | 2/1995 | Kreis et al. |
| 6,851,505 B2 | | 2/2005 | Motozawa et al. |
| 7,192,067 B2 | * | 3/2007 | Hansen ....................... 293/133 |
| 2001/0037908 A1 | | 11/2001 | Motozawa et al. |
| 2004/0169398 A1 | | 9/2004 | Browne et al. |
| 2006/0022473 A1 | * | 2/2006 | Hansen ....................... 293/133 |
| 2008/0018121 A1 | * | 1/2008 | Maya et al. ................. 293/132 |

FOREIGN PATENT DOCUMENTS

| | | |
|---|---|---|
| DE | 1 172 558 | 6/1964 |
| DE | 23 57 042 A1 | 5/1975 |
| DE | 43 05 490 A1 | 8/1994 |
| DE | 199 34 666 A1 | 1/2001 |
| DE | 10 2004 036 929 A1 | 3/2006 |
| EP | 0 074 705 A1 | 3/1983 |
| EP | 0 903 265 A2 | 3/1999 |
| EP | 1 106 480 A2 | 6/2001 |
| EP | 1 593 585 A1 | 11/2005 |
| EP | 1 184 261 B1 | 1/2007 |

* cited by examiner

*Primary Examiner*—Kiran B. Patel

(57) ABSTRACT

A motor vehicle has a support structure that contains longitudinal members and a crossmember. It is important that the crossmember, at a front/rear end, is fixedly connected to tubular crash elements which run in the longitudinal direction of the vehicle. The tubular crash elements respectively engage in an associated longitudinal member and are fixed therein coaxially with respect to the longitudinal member via at least two supporting points spaced apart from each other in the longitudinal direction of the vehicle.

3 Claims, 2 Drawing Sheets

SUPPORT STRUCTURE FOR A MOTOR VEHICLE HAVING LONGITUDINAL MEMBERS AND A CROSSMEMBER

CROSS-REFERENCE TO RELATED APPLICATION

This application claims the priority, under 35 U.S.C. § 119, of German application DE 10 2006 033 990.8, filed Jul. 22, 2006; the prior application is herewith incorporated by reference in its entirety.

BACKGROUND OF THE INVENTION

Field of the Invention

The present invention relates to a motor vehicle with a support structure having longitudinal members and a crossmember.

In order to be able to ensure the maximum possible protection of occupants, modern motor vehicles are equipped with "crumple zones" which, in the event of an accident, convert impact energy into deformation energy and thereby dissipate impact energy. In this case, basically two different requirements are to be brought into accord. First, a support structure of the motor vehicle is to be configured to be as stiff as possible and thus is to ensure the stiffness required of the vehicle body to provide a certain degree of driving comfort, but, second, the support structure is to be deformable in a certain manner during an accident and is to be able to convert impact energy into deformation energy by appropriate deformation.

Published, non-prosecuted German patent application DE 23 57 042 A1 discloses an energy absorption device, in particular for motor vehicles, which is preferably provided between a bumper and a body structure. The device is formed by a shock absorber and a plastically deformable support, the bumper being disposed, at least in some sections, next to at least one wall of the support in the longitudinal direction of the vehicle and being connected to the support via one or more supporting parts.

Further motor vehicles with energy-absorbing impact systems are known, for example, from European patent applications EP 1 106 480 A2 and EP 0 074 705 A1, corresponding to U.S. Pat. Nos. 6,851,505 and 4,426,109, respectively.

SUMMARY OF THE INVENTION

It is accordingly an object of the invention to provide a support structure for a motor vehicle having longitudinal members and a crossmember which overcomes the above-mentioned disadvantages of the prior art devices of this general type, which first improves the stiffness of a support structure and second has a positive effect on crash behavior.

With the foregoing and other objects in view there is provided, in accordance with the invention, a support structure for a motor vehicle. The support structure contains tubular crash elements running in a longitudinal direction of the motor vehicle and having an end, and longitudinal members each having an open end region and facing the tubular crash elements. A crossmember is provided which has a front end and a rear end. The crossmember at one of the front and rear ends is fixedly connected to the tubular crash elements. A respective one of the tubular crash elements engages coaxially, by the end facing away from the crossmember, in the open end region of an associated one of the longitudinal members. The tubular crash elements are supported on the longitudinal members via at least two supporting points spaced apart from each other in the longitudinal direction of the motor vehicle.

The present invention is based on the general concept, in the case of a motor vehicle with a support structure having longitudinal members and a crossmember, of connecting, in particular of welding, a front or a rear crossmember fixedly to crash elements running in the longitudinal direction of the vehicle. Each of the crash elements in an associated longitudinal member which is constructed as a hollow profile, is supported at least two points spaced apart from each other in the longitudinal direction of the longitudinal member. In comparison to previous supporting which has merely taken place at a single point, a significant increase in the stiffness of the support structure is thereby achieved. Usually, two tubular crash elements are connected to the front or rear crossmember and engage coaxially, by their end which faces away from the crossmember, in an open end region of the associated longitudinal member, which end region faces the crash element. The two supporting points, which are spaced apart from each other in the longitudinal direction of the vehicle, between the respective crash element and the associated longitudinal member can be undertaken, for example, at that end of the longitudinal member which faces the crossmember and at some distance from there at that end of the crash element which faces the longitudinal member. The at least two supporting points of the crash element in the/on the longitudinal member fix the crash element coaxially with respect to the longitudinal member and, as a result, via the connection to the crossmember, achieve improved stiffening of the support structure.

Expediently, at least one bulkhead element is disposed within the longitudinal member. The bulkhead element is penetrated by the associated crash element and the bulkhead element forms a second of the at least two supporting points disposed at a distance from each other in the longitudinal direction of the vehicle. A bulkhead element of this type, which for example, may also be of multipart configuration, first stiffens the longitudinal member and second fixes the crash element coaxially within the longitudinal member, with it being conceivable for the at least one bulkhead element to be connected fixedly to the longitudinal member, on the one hand, and fixedly to the crash element, on the other hand, or for it to form merely a sliding fit for the crash element. In both variant embodiments, a coaxial fixing of the crash element in the longitudinal member can be achieved, as a result of which, together with the fixed connection to the crossmember at the front/rear end, a particularly stiff support structure can be achieved.

A cover element expediently has a collar which projects in the direction of the tubular crash element and engages in an indentation found in a complementary manner thereto on the crash element. By use of the collar and the indentation formed in a complementary manner thereto, a predefined position of the crash element with respect to the longitudinal member can be achieved and, at the same time, a fixing of the crash element both in the axial and in the radial direction with respect to the longitudinal member.

In a further advantageous embodiment of the solution according to the invention, the collar and the indentation formed in a complementary manner thereto on the crash element form a sliding resistance which permits a displacement of the crash element relative to the longitudinal member only above a predefined force. The collar and the indentation formed in a complementary manner thereto therefore form an interlocking and frictional assembly, and therefore a displacement of the crash element relative to the longitudinal member takes place only above a certain force, namely only above the force at which either the crash element or the cover element is deformed. In the event of a crash, this deformation may likewise be used to dissipate the impact energy, that is to say to convert it into deformation energy. Until the predefined force is reached, a relative displacement between the longitudinal member and the crash element is not possible because of the material resistance. The sliding resistance thus formed from the collar and the indentation which is formed in a complementary manner thereto first determines the exact positioning of the crash element with respect to the longitudinal member and, when the predefined force is exceeded, converts impact energy into deformation energy and thereby helps to lessen the consequences of the accident.

It goes without saying that the features mentioned above and those which have yet to be explained below can be used not only in the respectively stated combination but also in other combinations or on their own without departing from the scope of the present invention.

Other features which are considered as characteristic for the invention are set forth in the appended claims.

Although the invention is illustrated and described herein as embodied in a support structure for a motor vehicle having longitudinal members and a crossmember it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
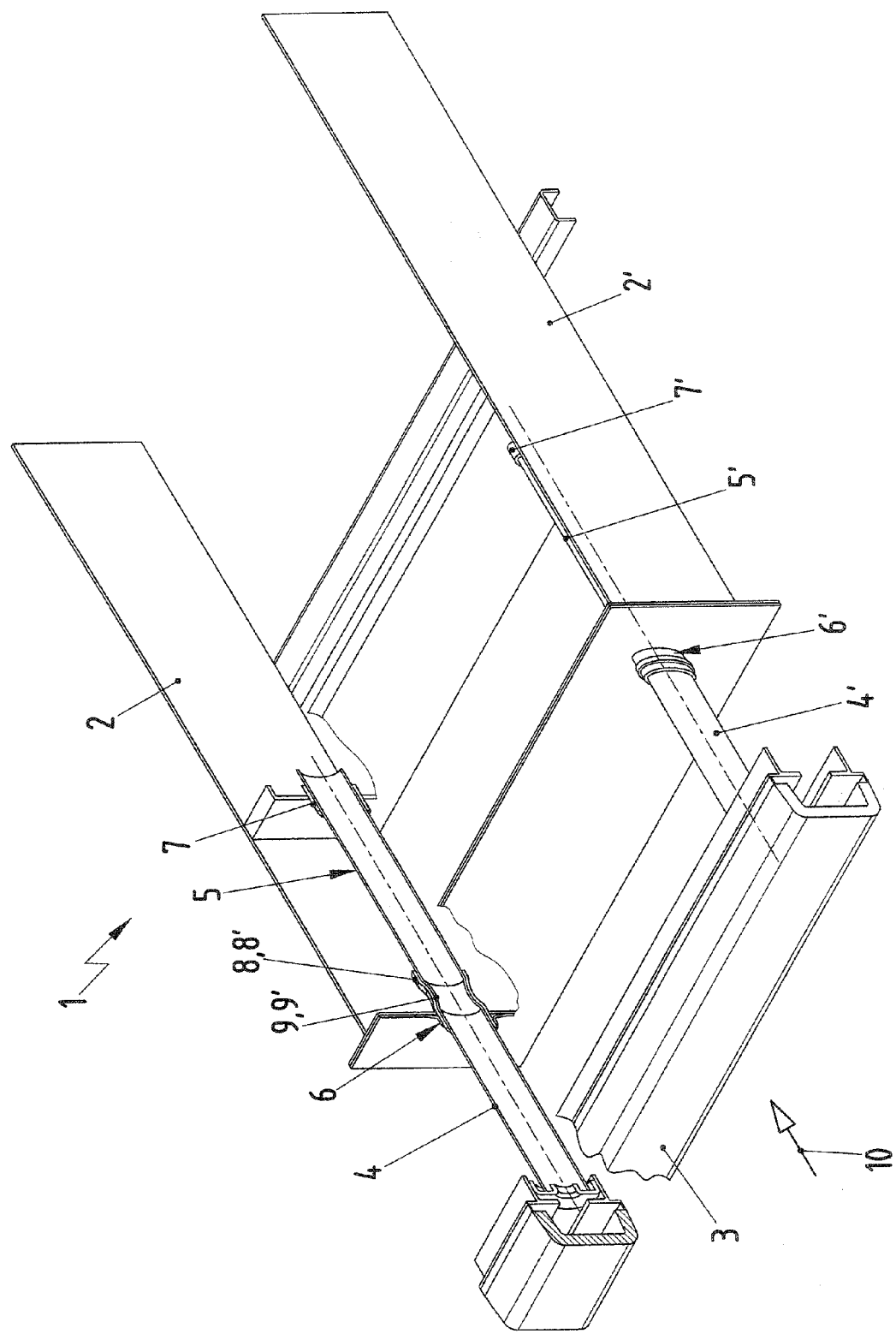
FIG. 1 is a schematic perspective view of a front support structure of a motor vehicle according to the invention.

Referring now to the figures of the drawing in detail and first, particularly, to FIG. 1 thereof, there is shown a front-end region of a support structure 1 of a motor vehicle (otherwise not illustrated) that has two longitudinal members 2 and 2 and a crossmember 3. In general, the crossmember 3 may be disposed at the front end of the longitudinal members 2 and 2' or at the rear end of the same. Two crash elements 4 and 4' are disposed between the crossmember 3 and the two longitudinal members 2 and 2' which crash elements are fixedly connected, in particular welded on the crossmember side to the crossmember 3. In this case, the crash elements 4 and 4' preferably have a tubular character. The respective crash element 4, 4' engages coaxially, by its end 5, 5' which faces away from the crossmember 3, in an open end region of the associated longitudinal member 2, 2', which end region faces the crash element 4, 4'. Like the two longitudinal members 2 and 2', the two crash elements 4 and 4' run in the longitudinal direction L of the vehicle.

Each of the two crash elements 4 and 4' is supported in the/on the respective longitudinal member 2, 2' via at least two points on the respective longitudinal member 2 and 2' that are spaced apart from one another in the longitudinal direction of the vehicle. This permits coaxial fixing of the respective crash element 4 and 4' in the/on the respective, associated longitudinal member 2, 2'. In this case, it is conceivable that, in addition to the two supporting points which are spaced apart from each other, there are supporting points (not shown), but at least two supporting points are provided according to the invention.

A first supporting point is formed by a cover element 6 or 6' which is disposed on an end of the longitudinal member 2, 2' that faces the crossmember 3. The respective cover element 6, 6' can either be of single-part or multipart configuration. As can be gathered from FIGS. 1 and 2, the respective crash element 4, 4' penetrates the respectively associated cover element 6, 6' and is fixed by the latter axially with respect to the respective longitudinal member 2, 2'.

A second connecting and supporting point is formed by a bulkhead element 7, 7' disposed from the respective cover element 6, 6' within the longitudinal member 2, 2' in the longitudinal direction of the vehicle, the respective bulkhead element 7, 7' being penetrated by the associated crash element 4, 4' and likewise forming a coaxial fixing of the crash element 4, 4' with respect to the respective longitudinal member 2, 2'. In this case, the respective cover element 6, 6' and/or the respectively associated bulkhead element 7, 7' may be configured as sheet-metal molded parts and connected fixedly to the respective longitudinal member 2, 2' via a suitable manner of connection, for example via adhesive bonding or welding.

Figure 2:
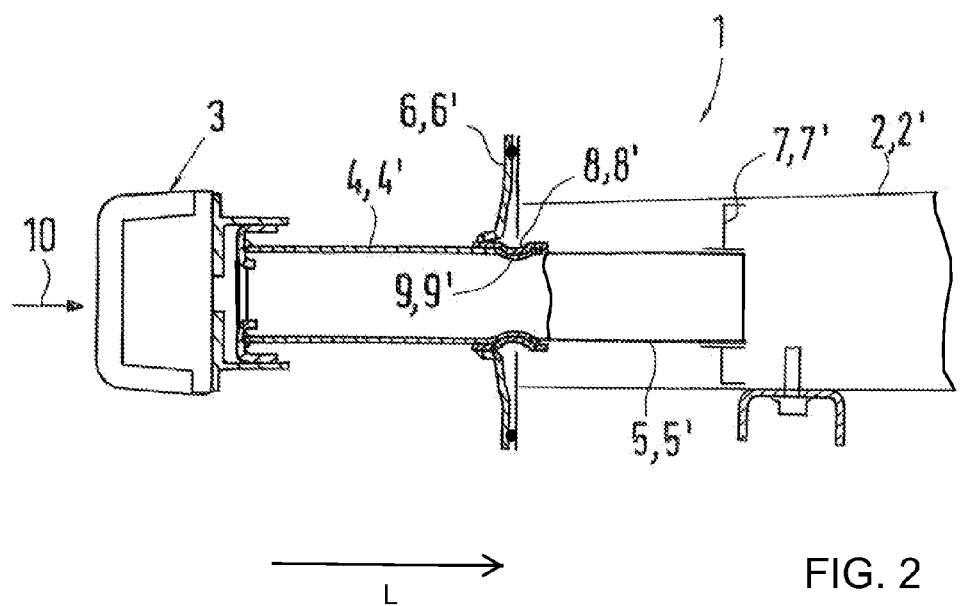
FIG. 2 is a diagrammatic, sectional view through a longitudinal member of the support structure along the section line A-A of FIG. 1 with a crash element connected thereto and with a crossmember.

According to FIG. 2, the cover element 6, 6' has a collar 8, 8' which projects in the direction of the tubular crash element 4, 4' and engages in an interlocking and/or frictional manner in an indentation 9, 9' formed in a complementary manner with respect thereto on the crash element 4, 4'. The interlocking/frictional connection between the collar 8, 8' and the indentation 9, 9' brings about a sliding resistance which permits a displacement of the crash element 4, 4' relative to the respectively associated longitudinal member 2, 2' only after a predefined force is exceeded. Of course, it is also conceivable for the collar 8, 8' to be formed on the crash element 4, 4' and for the indentation 9, 9' to be formed on the cover element 6, 6'.

Accordingly, when there is an impact in the impact direction 10, first of all an exceeding of the predefined force has to be achieved at which the collar 8, 8' is displaced relative to the associated indentation 9, 9' in the longitudinal direction of the support 2, 2' and, in the process, brings about, for example, either a plastic deformation of the crash element 4, 4' or the collar 8, 8', thus enabling impact energy to be converted into deformation energy. In the variant shown in FIG. 2, the second supporting point, i.e. the bulkhead element 7, 7', is configured as a sliding fit which does not provide any resistance to a displacement of the crash element 4, 4' relative to the longitudinal member 2, 2'. Of course, it is also conceivable in this case for the bulkhead element 7, 7' to undertake a similar interlocking/frictional connection with the crash element 4, 4' to the cover 6, 6'.

By the at least two supporting points, which are spaced apart in the longitudinal direction of the vehicle, of the crash element 4, 4' in the/on the associated longitudinal member 2, 2', a coaxial fixing of the crash element 4, 4' with respect to the longitudinal member 2, 2' is achieved, as a result of which a particularly great stiffening effect can be obtained in the transverse direction of the crash element 4, 4'. As a result, together with the crossmember 3, which is preferably of a torsion-proof configuration, a particularly stiff front or rear structure of the motor vehicle is achieved which has a positive effect in particular in the event of accidents.

In summary, the more important features of the solution according to the invention are now characterized.

The invention proposes, in the case of a motor vehicle with a support structure 1 having longitudinal members 2, 2' and a crossmember 3, fixing crash elements 4, 4', which are disposed in each case between the crossmember 3 and the longitudinal members 2, 2', coaxially with respect to the respective longitudinal member 2, 2' via at least two supporting points. This achieves a stiff connection, particularly in the transverse direction of the crash elements 4, 4', between the same and the respectively associated longitudinal member 2, 2', which has a positive effect in particular in the event of a crash.

The invention claimed is:

1. A support structure for a motor vehicle, the support structure comprising:
    tubular crash elements running in a longitudinal direction of the motor vehicle and having an end, said tubular crash elements each having an indentation formed therein;
    longitudinal members each having an open end region formed therein and facing said tubular crash elements; and
    a crossmember being fixedly connected to said tubular crash elements, a respective one of said tubular crash elements engaging coaxially, by said end facing away from said crossmember, in said open end region of an associated one of said longitudinal members;
    a cover element disposed at an end of each of said longitudinal members facing said crossmember, said cover element being penetrated by an associated one of said tubular crash elements, said cover element having a collar projecting in a direction of said associated tubular crash element and engaging in said indentation formed in a complementary manner thereto on said associated tubular crash element;
    said tubular crash elements supported on said longitudinal members via two supporting points spaced apart from each other in the longitudinal direction of the motor vehicle;
    said cover element forming a first of said at least two supporting points disposed at a distance from each other in the longitudinal direction of the motor vehicle;
    at least one bulkhead element disposed within each of said longitudinal members, said bulkhead element being penetrated by said associated tubular crash element, said bulkhead element forming a second of said at least two supporting points disposed at a distance from each other in the longitudinal direction of the motor vehicle.

2. The motor vehicle according to claim 1, wherein said collar and said indentation being complementary thereto form a sliding resistance permitting a displacement of said tubular crash element relative to said longitudinal member only above a predefined force.

3. The motor vehicle according to claim 1, wherein said crossmember is of a torsion-proof configuration.

\* \* \* \* \*